United States Patent

Vogl et al.

[15] 3,681,612

[45] Aug. 1, 1972

[54] DEVICE FOR ELIMINATING INTERFERENCE BETWEEN CONDUCTORS OF HIGH FREQUENCY SIGNALS

[72] Inventors: Willibald Vogl, Munchen; Johann Kinzler; Gottfried Goessl, both of Regensburg, all of Germany

[73] Assignee: Siemens Aktiengesellschaft, Berlin and Munich, Germany

[22] Filed: June 16, 1971

[21] Appl. No.: 153,686

[30] Foreign Application Priority Data

June 19, 1970 Germany.............P 20 30 360.0

[52] U.S. Cl.........................307/105, 333/12, 333/79

[51] Int. Cl...............................................H02j 1/02

[58] Field of Search............307/105, 149, 89, 90, 91; 321/9; 333/79, 12, 70 R

[56] References Cited

UNITED STATES PATENTS 2,959,738 11/1960 Nagai........................307/105 X

*Primary Examiner*—Herman J. Hohauser

*Attorney*—Carlton Hill et al.

[57] ABSTRACT

A device for eliminating interference between conductors which carry high frequency signals to main supply lines. The device has a metallic housing divided into first and second chambers. The conductors pass through the housing longitudinally and connect to the main supply lines. Highly inductive coils are coupled in series with the conductors in the first chamber, and relatively large value capacitances are coupled from a return conductor to the other respective conductors in both the first and the second chambers. Feed through capacitors are coupled from the housing to each conductor at the partition which divides the housing into the first and second chambers. Also, large resistors are coupled from the return conductor to each other conductor.

8 Claims, 1 Drawing Figure

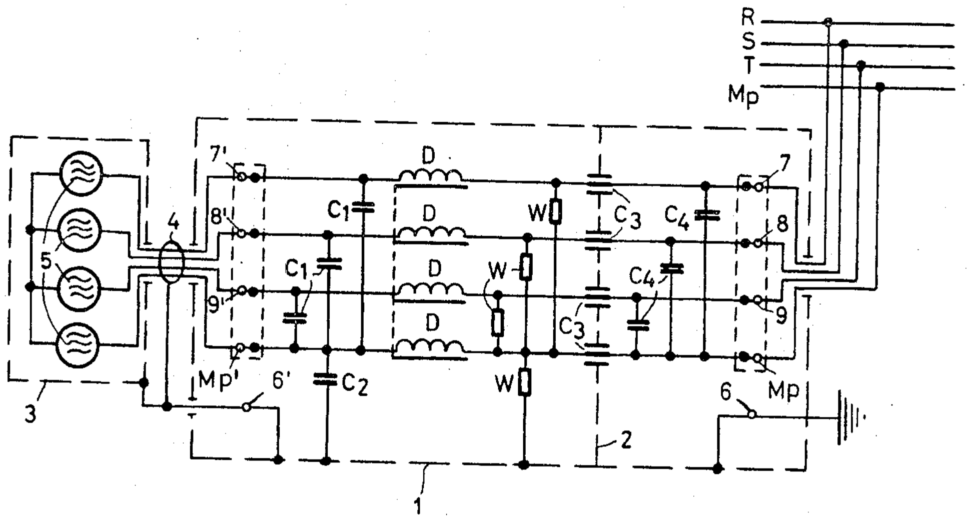
INVENTORS
Willibald Vogl
Johann Kinzler
Gottfried Goessl
BY Hill, Sherman, Meroni, Gross & Simpson ATTYS.

DEVICE FOR ELIMINATING INTERFERENCE BETWEEN CONDUCTORS OF HIGH FREQUENCY SIGNALS

BACKGROUND OF THE INVENTION

Field of the Invention

The field of art to which this invention pertains is devices for eliminating interference between conductors carrying high frequency signals.

SUMMARY OF THE INVENTION

It is a principal feature of the present invention to provide an improved device eliminating interference between conductors carrying high frequency signals.

It is another feature of the present invention to provide a device which is enclosed in a metallic housing for eliminating interference between conductors which couple high frequency sources to respective main supply lines.

It is a principal object of the present invention to provide a device which effectively eliminates interference between conductors carrying high frequency signals wherein a shielded housing is divided into two chambers and wherein means are included in each of the chambers to protect against interference between the respective lines.

It is another object of the present invention to provide a device as described above wherein a relatively high value of capacitance is coupled between one of the conductors within the housing and each other one of the conductors. It is a further object of the invention to provide a device of the type described above wherein a choke of high inductivity is coupled in series with each one of the plurality of conductors within the first chamber.

It is also an object of the present invention to provide feed through capacitors which are coupled from the respective conductors to the partition which divides the metallic housing into first and second chambers.

These and other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

BRIEF DESCRIPTION OF THE DRAWING

The single FIGURE shown in the drawing illustrates a series of high frequency sources which are connected to a number of conductors which extend through a shielded type housing to main supply lines. The housing is divided into first and second chambers, and passive circuit elements are arranged in each one of the chambers to eliminate interference between the circuit lines.

DESCRIPTION OF THE PREFERRED EMBODIMENT

The present invention relates to a device for eliminating interference between main supply lines of conductors carrying signals from a high frequency source to operative devices such as data processing devices.

When attempts are made to miniaturize devices, particular attention must be given to the need to develop interference eliminating devices of low weight and compact in size. For application in electronic data processing devices, the voltage lines are required to have only a small leakage current to ground during operation. Further, the current pulse to ground produced by switching the device on must be kept small such that other calculator units are not influenced by current pulses in the common ground wire.

Interference eliminating devices are desired to cause only a minor voltage drop, to have a high damping effect, and in addition, to have only a slight heating effect. The minimum requirements for interference eliminating devices are determined in Germany by the VDE Rules ("Verband Deutscher Elektrotechniker," an electrical association in Germany, similar to Underwriters' Laboratories). The present invention was developed to provide an interference eliminating device which satisfies these requirements.

The device of the present invention is characterized by a series of chokes and capacitances which are arranged in a housing of sheet steel which is sub-divided by a partition at the two chambers which are shielded from each other.

In the chamber which faces the device producing the high frequency signals, relatively large capacitors are coupled symmetrically between the lines which are to be free of interference. These capacitors are connected symmetrically from the three phase conductors to the return conductor. A capacitor having a relatively small value is coupled from the common connection of these large capacitors at the return conductor to circuit ground.

Following the symmetrically coupled capacitances, chokes having high inductive reactances are connected in series in each one of the circuit lines including the return conductor.

The circuit lines or conductors pass from the first chamber into the second chamber and finally conduct to the main supply lines. One feed through capacitor having a relatively low capacitance value is coupled between each one of the conductors and the housing. Also, in the second chamber which faces toward the main supply lines, capacitors of relatively high capacitance values are coupled between the return conductor and the various phase conductors.

By means of the above device, operational failures such as the triggering of sensitive fault-current protecting switches, is avoided due to the low capacitance connection to the ground wire. Also, interference of other calculator units due to the presence of operational currents which flow from the ground wire is minor since the input and output sides of the housing are isolated from each other.

In addition to the above described apparatus, relatively high resistances may be coupled between the plurality of conductors and the ground wire at the connection point between the chokes and the feed through capacitances. These resistors assure suitable discharge paths for the various capacitors which may have accumulated charges.

The chokes are preferably wound on a single air-gap-free ring core in such a way that the magnetic fluxes which are caused by the individual windings cancel one another. Therefore in spite of a need for high inductivity, only a small amount of magnetic core material is needed. Therefore, the entire arrangement can be built to have a minimum size and weight.

Referring to the drawing in greater detail, the single figure shows an interference elimination arrangement for a three phase device with a return conductor Mp. Sources 5 present in a device 3 producing undesirable high frequency signals are coupled to a series of connectors 7', 8', 9', and Mp' associated with the interference eliminating device. The shield of the cable is connected to a metallic housing 1 of the device at a connection point 6'.

The interference eliminating device itself comprises the housing 1 with a high frequency protective partition 2. The three phase conductors are shown within the housing and are connected to the terminals 7', 8' and 9', while a return conductor is connected to the terminal Mp'.

Capacitors $C_1$ are connected from Mp' conductor to each of the three phase conductors as shown within the first chamber which is to the left of the partition 2. A capacitor $C_2$ having a relatively low capacitance value is coupled from the reference conductor Mp' to a protective wire or circuit ground shown symbolically at the opposite end of $C_2$. A number of chokes identified by the letter D are coupled in series with each one of the conductors. They are shown as being wound on a single ring core made of ferrite material. Each of these chokes is symmetrically wound on a ring of ferromagnetic material in such a way that the magnetic flux associated with each winding is cancelled by the fluxes associated with the other windings.

The four conductors pass through the partition 2 in such a way that each conductor is coupled by means of a relatively small capacitor $C_3$ to the housing 1. Also, a series of relatively high resistances W are connected from the reference conductor Mp' to each one of the other conductors. Also one of these resistances is connected from the reference conductor to the protective wire or ground shown symbolically at the opposite end of that resistance. These resistances are sure that the various capacitances can discharge after the main power has been switched off.

In the second chamber which is facing the main supply lines, RSTMp, a series of relatively large capacitors $C_4$ are coupled from the return line Mp to each of the other conductors. In this chamber, it is not necessary to have a capacitor such as the capacitor $C_2$ coupled from the return conductor to the ground wire. The various conductors are then connected to a series of terminals 7, 8, 9, and Mp which in turn are connected to the indicated main supply lines RSTMp.

The values of the elements in the above described circuit may take on the following relationship.

$C_1 = 1\ \mu F$
$C_2 = 0{,}035\ \mu F$
$C_3 = 0{,}05\ \mu F$
$C_4 = 1\ \mu F$
$D = 1.1\ mH$
$W = 1\ M\Omega$ Through the use of the above-described arrangement, including having the chokes wound on a single ring, the attenuation was found to be better than 40 db over a wide frequency range from 100 kHz to 100 MHz, and thus the device fully complies with the required specifications.

We claim as our invention:

1. A device for eliminating interference in the main supply lines caused by high frequency producing electronic equipment, in particular by electronic data processing equipments, all of which are connected to a common ground line comprising:
   - a metallic housing having a partition which divides the same into first and second chambers shielded from each other, a plurality of electronic components in the said first and second chamber,
   - means for connecting one end of the said device to the said interference producing equipment and means for connecting the other end of the said device to the said main supply lines,
   - a plurality of capacitors each having a relatively large capacitance value being connected between one of the conductors to the remaining conductors in both said first and second chambers,
   - chokes of high inductivity coupled in series with each of the plurality of conductors in said first chambers, feed throughs for each of the conductors from the first to the second chamber by means of feed through-capacitors of low capacitance value.

2. A device in accordance with claim 1 wherein one of the plurality of conductors is a return conductor and wherein each of said capacitors of relatively large capacitance is connected from said return conductor to each of the remaining of said plurality of conductors.

3. A device in accordance with claim 2 wherein a relatively small value capacitor is coupled from circuit ground to said return conductor within said first chamber.

4. A device in accordance with claim 2 wherein a plurality of relatively large value resistors are coupled from the return conductor to respective other ones of said plurality of conductors and wherein a resistor is coupled from circuit ground to said return conductor.

5. A device in accordance with claim 4 wherein said resistors are connected to the plurality of conductors at the junction point of said chokes and said feed through capacitors within said first chamber.

6. A device in accordance with claim 1 wherein the chokes are wound together on a single air gap free ring core in such a way that the magnetic flux of each winding is cancelled by the effects of the other windings.

7. In electronic equipment having a plurality of sources of high frequency signals fed by main supply lines, a device for eliminating interference comprising:
   - a metallic housing having a partition which divides the same into first and second chambers, shielded from each other, a plurality of electronic components in the said first and second chamber,
   - means for connecting one end of the said device to the said interference producing equipment and means for connecting the other end of the said device to the said main supply lines,
   - one of said plurality of conductors being a return conductor,
   - a plurality of capacitors of relatively large capacitance value connected between said return conductor and respective ones of the remaining conductors,
   - a relatively small capacitor connected between the return conductor and circuit ground,
   - feed through capacitors coupled between each of said conductors and the housing at the portion thereof which divides the housing into said first and second chambers, and chokes of high inductivity coupled in series with each of said plurality of conductors in said first chamber, relatively large resistors coupled between the return conductor and respective ones of the other conductors and from the return conductor to circuit ground, said resistors being connected to the other conductors at the junction point of said chokes and said feed through capacitors, whereby the main supply lines are rendered interference free.

8. A device for eliminating interference in accordance with claim 7 wherein said chokes are wound on a single ring core with cancelling magnetic effects.

* * * * *